United States Patent [19]
Smith et al.

[11] 3,907,081
[45] Sept. 23, 1975

[54] MOUNTING ARRANGEMENT FOR A CALIPER BRAKE

[75] Inventors: Philip A. Smith, Troy; Ronald H. Setser, West Milton, both of Ohio

[73] Assignee: The B. F. Goodrich Company, Akron, Ohio

[22] Filed: May 3, 1974

[21] Appl. No.: 466,727

Related U.S. Application Data

[63] Continuation-in-part of Ser. No. 412,888, Nov. 5, 1973, abandoned.

[52] U.S. Cl............................ 188/73.3; 188/18 A
[51] Int. Cl.²........................................ F16D 65/02
[58] Field of Search ....... 188/71.1, 72.4, 72.5, 73.3, 188/18 A; 248/176, 177

[56] References Cited
UNITED STATES PATENTS

| | | | |
|---|---|---|---|
| 2,924,301 | 2/1960 | Durst et al. | 188/72.4 |
| 3,220,512 | 11/1965 | Coatalen | 188/72.4 |
| 3,251,436 | 5/1966 | Afanador et al. | 188/72.5 |
| 3,392,807 | 7/1968 | Sommers | 188/72.4 |
| 3,758,129 | 9/1973 | Ishikawa et al. | 188/18 A |

FOREIGN PATENTS OR APPLICATIONS

| | | | |
|---|---|---|---|
| 1,269,737 | 7/1961 | France | 188/73.3 |

Primary Examiner—George E. A. Halvosa
Assistant Examiner—Edward R. Kazenske
Attorney, Agent, or Firm—W. A. Shira, Jr.; Frederick K. Lacher

[57] ABSTRACT

A caliper brake having a U-shaped mounting flange for bolting to an annular torque flange at spaced-apart positions at the end and two legs for easy removal and installation of the brake head assembly over a vehicle axle. The bolt holes located in the legs of the mounting flange are at increased distances from the axle for providing the necessary strength for operation of the brake.

4 Claims, 6 Drawing Figures

MOUNTING ARRANGEMENT FOR A CALIPER BRAKE

BACKGROUND OF THE INVENTION

This invention is a continuation-in-part of copending U.S. Application Ser. No. 412,888 filed Nov. 5, 1973 now abandoned.

It relates to a caliper type disc brake in which a caliper brake head assembly is mounted on a torque flange welded or otherwise fastened to a vehicle axle. Heretofore, the brake head assembly has included an annular mounting flange encircling the axle and fastened to an annular torque flange by bolts extending through the mounting flange and threaded in the torque flange. This construction has provided the necessary strength to support the brake head assembly and convey torque to the torque flange; however, it has presented problems during servicing of the brake. With this annular mounting flange construction, it has been necessary to remove the wheel and bearing assembly from the axle in order to remove the brake head for service. This additional time and effort to remove the wheel and bearing assembly from the axle has been very objectionable because of the cost of labor and the additional time the vehicle is out of service. Brakes of this type are used on large vehicles such as trucks and buses representing many thousands of dollars in capital investment. Consequently, the time these vehicles are out of service becomes very critical from a cost standpoint. There is also the possibility of damaging the bearing assembly in removing the wheel making it even more undesirable to have to go through this procedure to service the brake head.

SUMMARY OF THE INVENTION

The caliper brake of this invention has a brake head assembly which can be removed for service by removing the wheel rim only and unscrewing the bolts holding the mounting flange to the torque flange. The mounting flange has a U-shape providing an opening for removal from the axle and permitting the brake head to be installed and removed quickly and without the necessity of removing the wheel and bearing assembly. The closed end and legs of the mounting flange have holes for mounting bolts which are closely spaced in groups to provide the necessary fastening strength. Alternatively the legs of the mounting flange may have holes for mounting bolts which are spaced a greater distance from the axis of the axle than the holes in the connecting end portions of the U-shaped flange. The legs are also structurally formed and reinforced to provide the necessary strength while at the same time the opening between the leg is shaped to permit easy removal and installation of the brake head.

The accompanying drawings show one preferred form and a modification of the caliper brake made in accordance with and embodying this invention and which are representative of how this invention may be practiced.

DETAILED DESCRIPTION

Figure 1:
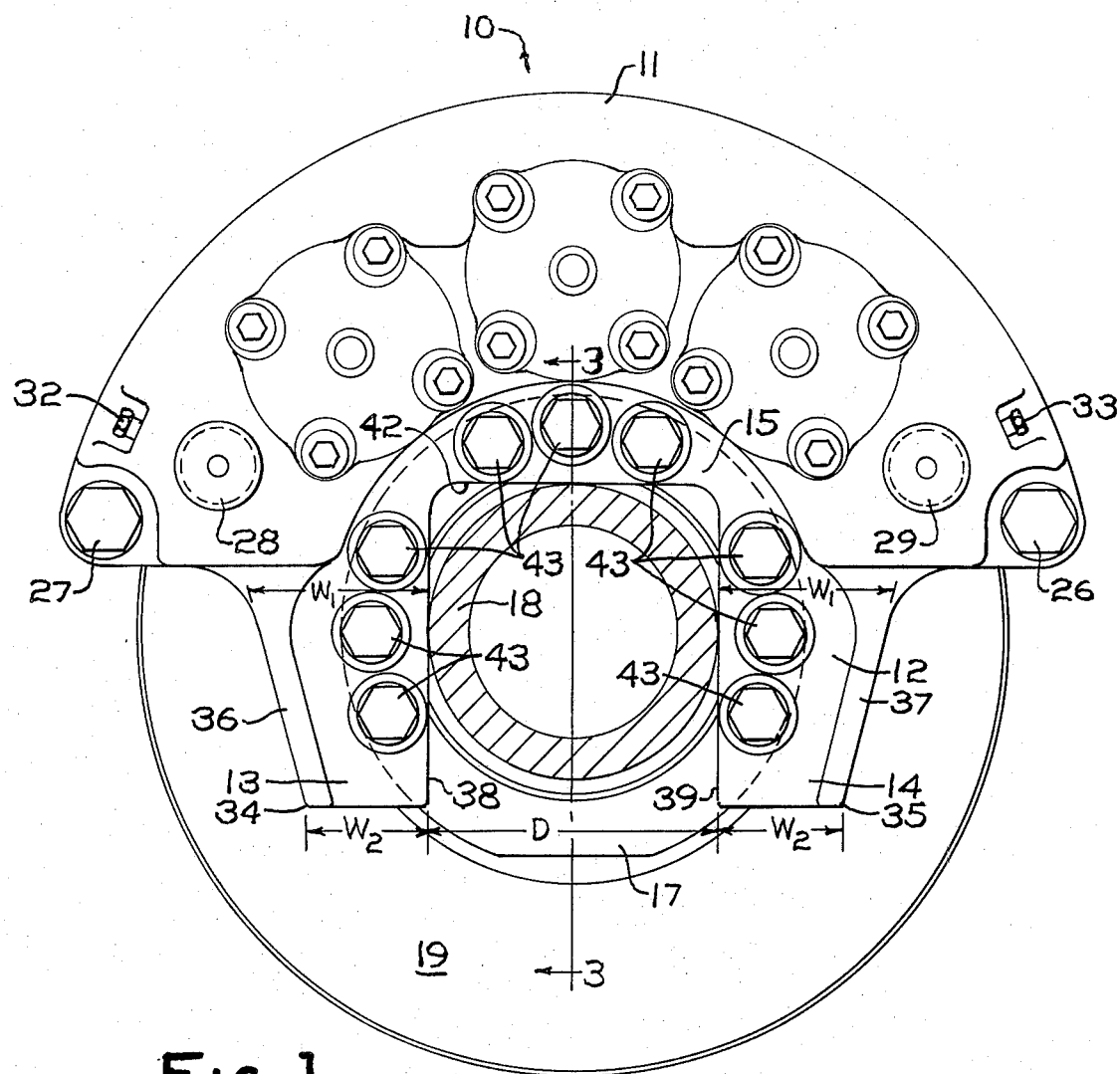
FIG. 1 is an inboard elevation of a caliper type brake incorporating the mounting flange with the axle being shown in cross section.
Figure 2:
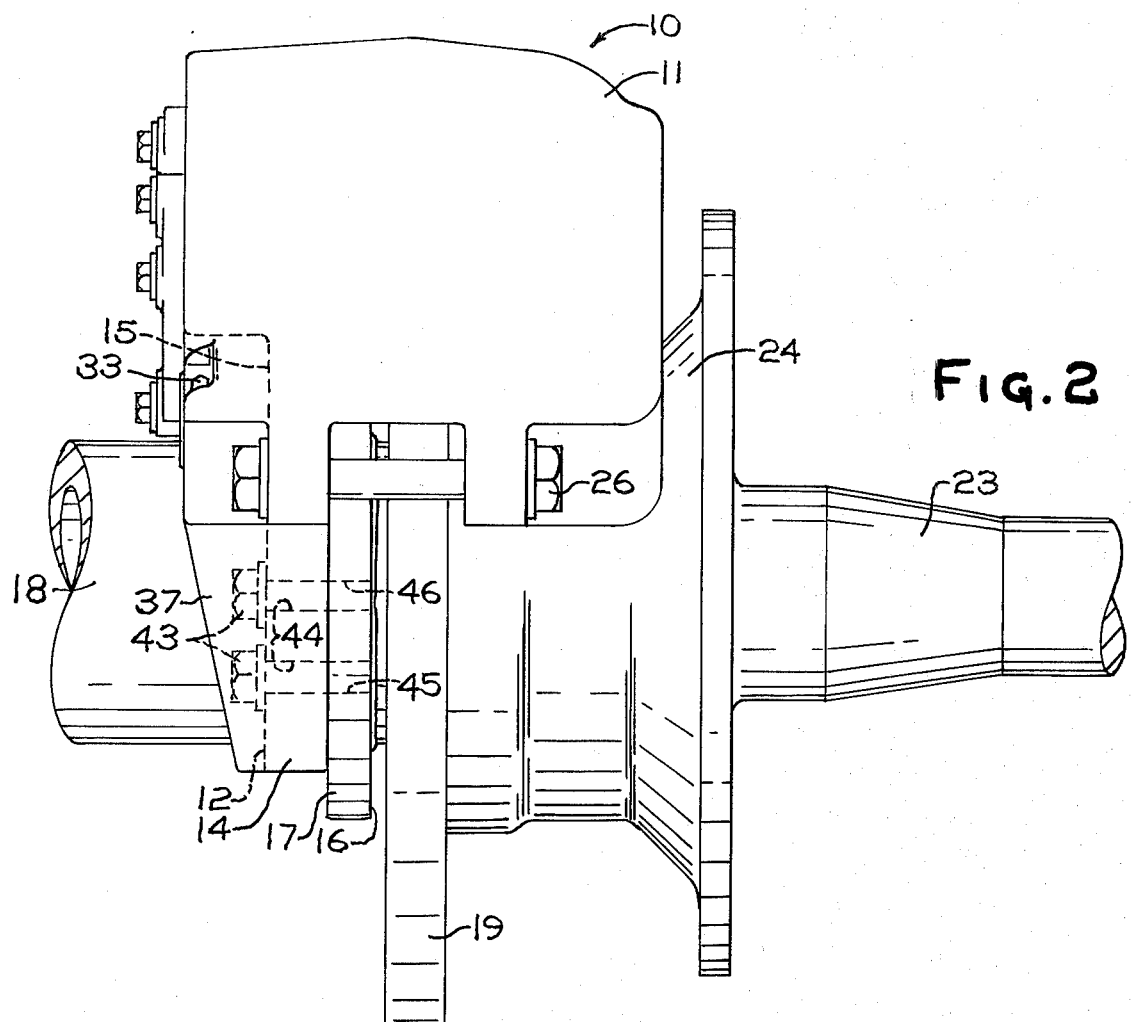
FIG. 2 is a side elevation of the brake shown in FIG. 1 with parts of the axle being broken off.

A caliper disc brake 10 is shown in FIGS. 1 and 2 and has a brake head assembly 11 which may be of cast steel or other high strength material. The brake head assembly 11 has a mounting flange 12 which is U-shaped with legs 13 and 14 and a connecting end portion 15.

The mounting flange 12 has a mounting face 16 for face-to-face contiguous engagement with an annular torque flange 17 fixedly mounted on an axle 18 as by welding.

A rotatable brake disc 19 is positioned adjacent the torque flange 17 and has a central opening 22 through which the axle 18 extends. The axle 18 has a spindle 23 at one end for receiving a bearing assembly and wheel (not shown).

Figure 3:
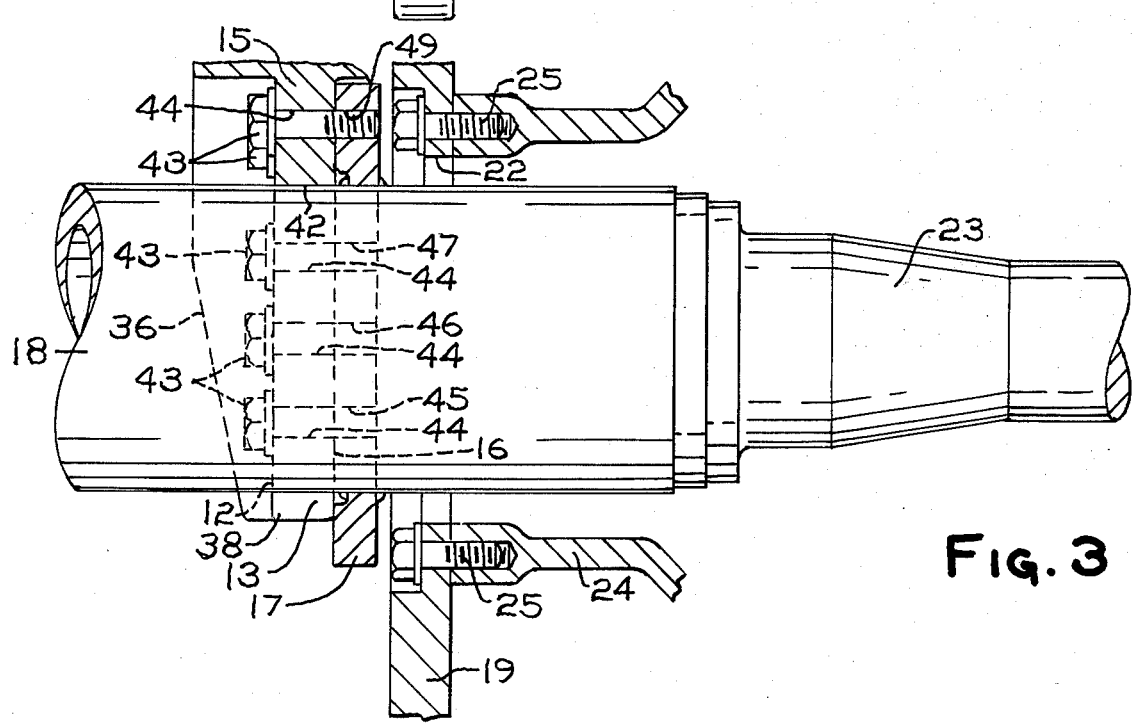
FIG. 3 is a fragmentary sectional view like FIG. 2 taken along the plane of line 3—3 of FIG. 1.

As shown in FIGS. 2 and 3, a cylindrical flange 24 is fastened to the brake disc 19 by studs 25 and has an annular flanged portion for fastening to a vehicle wheel by bolts or nuts (not shown).

The brake head assembly 11 contains the caliper brake friction members (not shown) for braking engagement with the brake disc 19 which may be actuated by a fluid medium such as air or hydraulic fluid. Thrust pins 26 and 27 at the sides of the brake head assembly 11 retain the linings and permit replacement of the linings by removal of one of the pins 26 or 27 which permits the lining to drop out of the slot in the head assembly 11 so that a new lining may be inserted. The linings are supported by torque takeout pins 28 and 29 held in place by locking screws 32 and 33.

As shown in FIG. 1, the width ($W1$) of the legs 13 and 14 is greater than the width ($W2$) at the distal ends 34 and 35 of the legs. Ribs 36 and 37 on the legs 13 and 14, respectively, are connected to the main body of the brake head assembly 11 and further provide reinforcement to the legs.

Inner edges 38 and 39 of legs 13 and 14, respectively, are substantially parallel and are spaced apart a distance ($D$) which is substantially the same as the diameter of the axle 18 but not less than that diameter providing a close fit over the axle. The end portion 15 of the mounting flange also has an inner edge 42 which is substantially perpendicular to the inner edges 38 and 39 of the legs and is in close proximity to the axle 18. The inner edges 38, 39 and 42 provide a rectangular opening for movement of the mounting flange 12 over the axle 18.

The mounting flange 12 is fastened to the torque flange 17 by mounting bolts 43 extending through holes 44 in the mounting flange into threaded holes 45 through 53 in matching relationship with the holes in the mounting flange. The mounting bolts 43 are screwed into the threaded holes 45 through 53 with a torque providing a tight connection.

Figure 4:
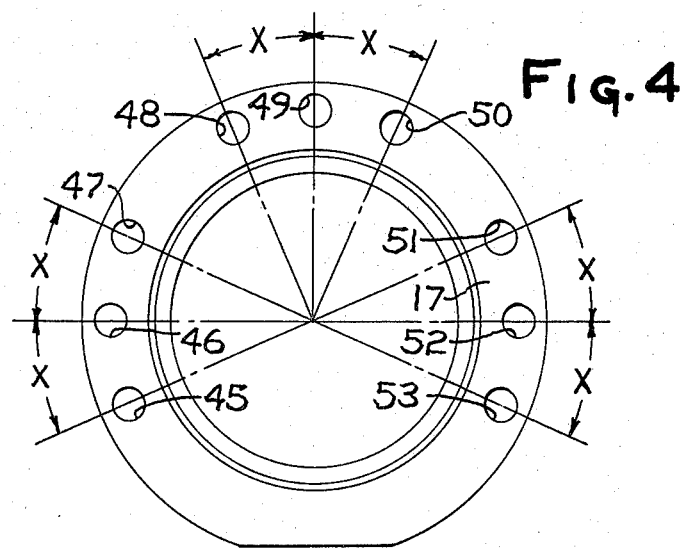
FIG. 4 is an inboard elevation of the torque flange shown in FIGS. 1 through 3.

As shown in FIG. 4, the threaded holes 45 through 53 in the torque flange 17 are closely spaced in the following groups: holes 45, 46 and 47 for legs 13, holes 48, 49 and 50 for end portion 15 and holes 51, 52 and 53 for leg 14 to match the holes in the mounting flange. The holes of each group are preferably spaced at an angle $(X)$ of around 24°.

In operation, the brake head assembly 11 may be removed by removing the rim of the wheel which extends over the brake head assembly and then unscrewing mounting bolts 43 whereupon the brake head assembly can be pulled off the axle 18 and the brake disc 19 in a direction radially of the axle. Likewise, to install the brake head assembly 11 it is only necessary to slide the mounting flange 12 over the axle 18 with the brake disc 19 sliding into position in the brake head assembly, as shown in FIG. 2. There is no need to disassemble the brake disc 19 from the wheel or remove the wheel and bearing assembly and accordingly a substantial savings in time is achieved along with a savings in wear and tear on the wheel parts that would otherwise have to be handled.

The mounting flange 12 of this invention may also be used with brake head assemblies for other sizes and types of disc brakes.

Figure 5:
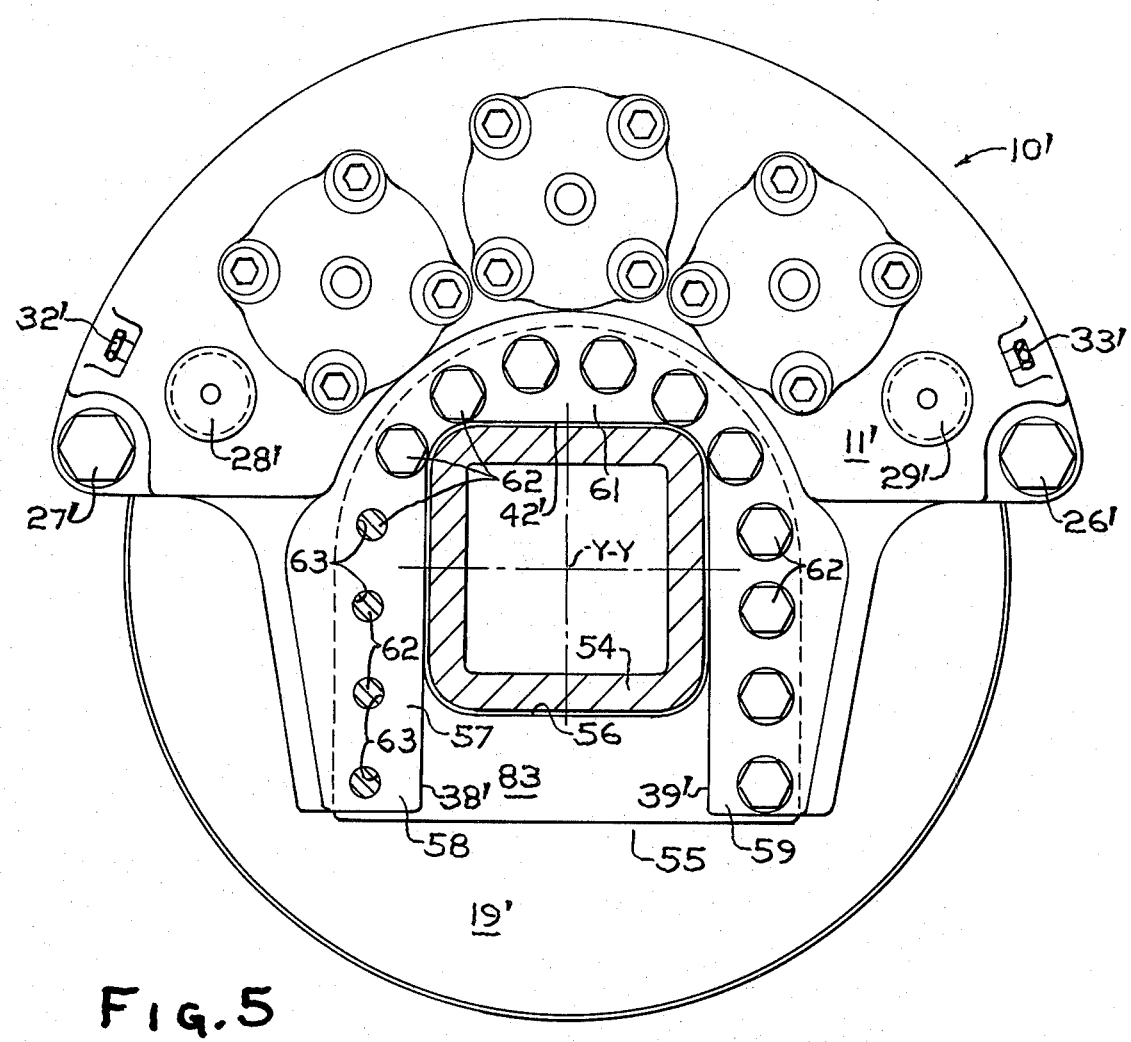
FIG. 5 is an inboard elevation like FIG. 1 of a modification of the invention showing another arrangement of the mounting flange holes and with the torque flange mounted on a square shaft.
Figure 6:
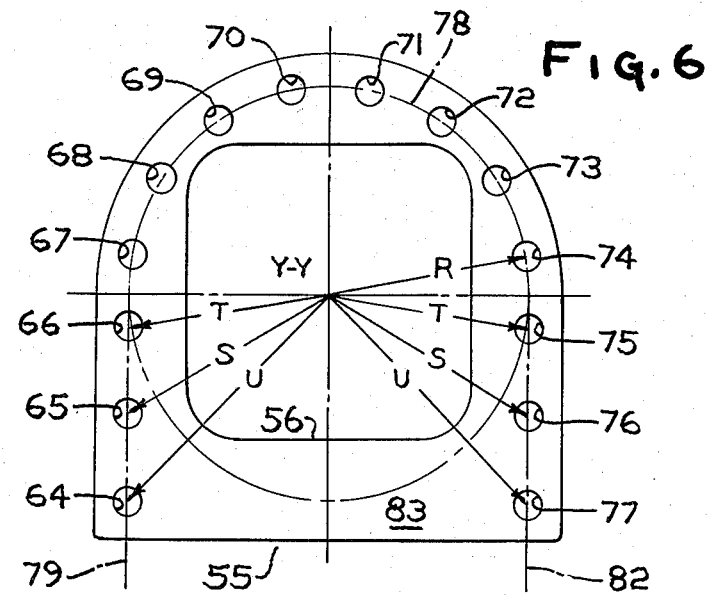
FIG. 6 is an inboard elevation like FIG. 4 of the torque flange shown in FIG. 5.

Referring to FIGS. 5 and 6, a modification is shown in which a hollow axle 54 has a substantially square cross section in the portion supporting the caliper disc brake 10'. An axis Y—Y extends longitudinally of the axle 54.

The torque flange 55 has a central opening 56 conforming to the shape of the axle 54 for mounting of the flange on the axle and fastening to the axle as by welding.

A mounting flange 57 on a brake head assembly 11' is U-shaped with legs 58 and 59 and a connecting end portion 61. The mounting flange 57 is fastened to the torque flange 55 by mounting bolts 62 extending through openings 63 in the mounting flange into corresponding threaded holes 64 through 77 in the mounting flange providing a tight connection between the torque flange and mounting flange.

As shown in FIG. 6, the holes 67 through 74 of the torque flange 55 have axes which are positioned in a cylindrical surface indicated by bolt hole circle 78 having a radius $(R)$ which in this embodiment is approximately 7½ inches. The bolt hole circle 78 is concentric with the axis Y—Y of axle 54. The holes 67 through 74 are located at the portion of the torque flange 55 which is fastened to the end portion 61 of the mounting flange 57.

Holes 64, 65 and 66 at the side of the torque flange 55 fastened to leg 58 of the mounting flange 57 have axes in a plane tangent to the cylindrical surface indicated by the bolt hole circle 78. This plane is indicated by dot-dash lines 79 in FIG. 6. On the other side of the torque flange 55, holes 75, 76 and 77 have axes positioned in a plane indicated by dot-dash line 82 and this plane is also tangent to the cylinder surface indicated by the bolt hole circle 78.

Referring again to FIG. 6, the distance from the axis Y—Y of the axle 54 to holes 66 and 75 is indicated by letter $(T)$, the distance from the axis Y—Y to the axes of holes 65 and 76 is indicated by letter $(S)$ and the distance from the axis Y—Y to the axes of holes 64 and 77 is indicated by the letter $(U)$. In the embodiment shown, the distance $(T)$ is 7¾ inches or slightly greater than the distance $(R)$ of seven and one-half inches for the holes 67 through 74. The distance $(S)$ for holes 65 and 76 is approximately 9½ inches and the distance $(U)$ is approximately 10¾ inches for holes 64 and 77. With this arrangement, substantially the same torque forces are transmitted from the legs 58 and 59 of the mounting flange 57 through the bolts 62 in the holes 64, 65 and 66 on one side and holes 75, 76 and 77 on the other side of the torque flange as would be transmitted if the bolts were in a flange with the holes located on the bolt circle 78 because of the increased radii $(T)$, $(S)$ and $(U)$ between the axis Y—Y of axle 54 and the axes of the holes.

The planes indicated by lines 79 and 82 containing the axes of holes 64–66 and 75–77 are preferably parallel as are the legs 58 and 59 to provide for sliding movement of the mounting flange 57 over the square axle 54 upon removal of the mounting bolts 62.

As shown in FIG. 6, the torque flange 55 has a curved contour at the side of the axle 54 which is fastened to the end portion 61. On the other side of the axle 54 which is fastened to the legs 58 and 59, the torque flange 55 has a substantially rectangular shape with a straight web portion 83 serving to connect the legs 58 and 59 of the mounting flange in the assembled condition shown in FIG. 5. Accordingly, with this construction a removable U-shaped mounting flange 57 is provided on the brake head 11' which has the same or greater strength than a conventional annular mounting flange with bolts spaced around the bolt circle 78.

Referring to FIG. 5, the brake head assembly 11' is similar to the brake head assembly shown in FIG. 1 with thrust pins 26' and 27', torque take-out pins 28' and 29' held in place by locking screws 32' and 33'. The brake disc 19' is mounted on a wheel (not shown) and suitable fluid medium such as air or hydraulic fluid is provided for actuating the brake. Removal and installation of the brake head assembly 11' is accomplished in the same manner as described hereinabove for the embodiment shown in FIGS. 1 through 4.

We claim:

1. A caliper brake having a brake head assembly secured to a torque flanged by threaded fasteners screwed in spaced-apart holes in said torque flange with said torque flange being fixedly mounted on an axle comprising a mounting flange on said brake head assembly having a U-shape with an end portion and two legs for positioning over said axle and contiguous with said torque flange, said mounting flange having a plurality of openings in each of said legs disposed at spaced-apart positions along said legs and in said end portion in matching relationship with said holes in said torque flange for receiving said threaded fasteners whereby said brake head assembly can be installed and removed by insertion or removal of said threaded fasteners and movement of said legs of said mounting flange into and out of straddling relationship with said axle, said axle having an axis and said openings in said legs of said mounting flange which are located at a greater distance from said end portion being spaced at a greater distance from said axis to increase the force transmitted by said legs to said torque plate.

2. A caliper brake according to claim 1 wherein the axes of said openings in each of said legs which are spaced the greatest distance from said end portion have axes in a plane tangent to a cylinder with the same axis as said axle and the same radius as the distance between the axis of said axle and the axes of the openings for the fasteners threaded in said end portion.

3. A caliper brake according to claim 2 wherein said plane containing the axes of said holes of one of said legs is parallel to said plane containing the axes of said holes for the other of said legs.

4. A caliper brake according to claim 1 wherein said torque flange has a curved contour at the portion fastened to said end portion and a substantially rectangular contour at the portion fastened to said legs with the axes of said holes in said portion fastened to said end portion being positioned in a cylindrical surface of a cylinder concentric with said axis of said axle and the axes of said holes in the portion fastened to said legs being in planes tangent to a cylinder concentric with said axle axis.

* * * * *